*Babcock & Goodsell,*
*Knife.*
No. 101,209. Patented Mar. 29, 1870.
Fig. 1.
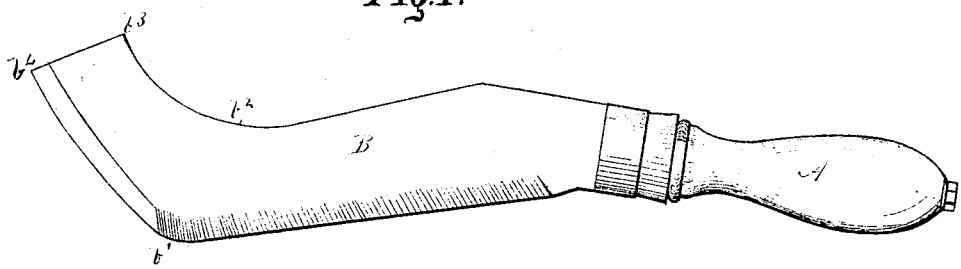
Fig. 2.
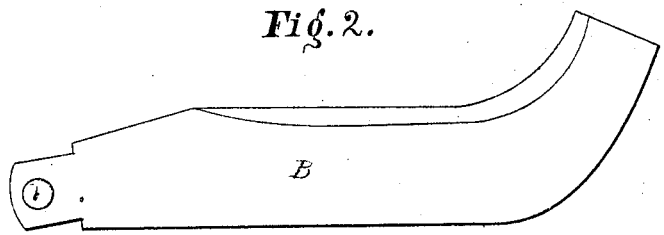
Fig. 3. Fig. 4.
 
Witnesses
S. J. Noyes,
George Worden.
Inventor
Noyes E. Babcock &
George D. Goodsell by
H. W. Beadle atty.

United States Patent Office.

NOYES E. BABCOCK AND GEORGE D. GOODSELL, OF ROCKFORD, ILLINOIS.

Letters Patent No. 101,209, dated March 29, 1870.

---

IMPROVEMENT IN KNIVES.

---

The Schedule referred to in these Letters Patent and making part of the same.

---

*To all whom it may concern:*

Be it known that we, NOYES E. BABCOCK and GEORGE D. GOODSELL, of Rockford, in the county of Winnebago and State of Illinois, have invented a new and useful Improvement in Knife; and we do hereby declare that the following is a full and exact description of the same, reference being had to the accompanying drawings and to the letters of reference marked thereon.

This invention has for its object the production of an improved implement adapted for convenient use in cutting straw bands, pruning shrubs and vines, and skinning animals, and consists of a blade, suitably attached to a handle, which is peculiarly curved, and provided with serrated and smooth edges, as will be fully described hereinafter.

In the drawings—

Figure 1 represents a side elevation of my improved knife;

Figure 2, a view of the blade detached; and

Figures 3 and 4, views of the retaining rod, nut, and washer.

To enable others skilled in the art to which our invention belongs to make and use the same, we will now proceed to describe fully the construction and manner of using the same.

A represents a handle of any proper form and size.

B represents the blade, which is provided, at its rear end, with an opening, $b$.

C represents a rod, which is cut, at one end, to form the hook $c$, and provided with screw-threads at the other, as shown.

The rod C is caught into the opening $b$ of the blade by means of its hooks $c$, and after being inserted into the handle is secured in place by means of a nut, which is screwed upon its projecting end.

The hook $c$ of the rod is preferably cut into the rod in order to permit the blade of the knife to hang in the center of the handle.

The blade is peculiar in shape. It extends forward from the handle in lines forming an angle of about ten degrees from the longitudinal center line of the latter until the points $b^1$ $b^2$ are reached, at a distance somewhat greater than the length of the handle itself, at which points a short curve is made up to and beyond the center line, as is clearly shown in the drawings.

By this peculiar construction several advantages are obtained. The serrated edge, from the handle to $b^1$, is especially adapted for a downward drawing stroke, such as is given in cutting straw-bands.

The smooth edge upon the opposite side, together with the smooth edge of the inner side of the sharp curve from $b^2$ to $b^3$ is especially adapted for an upward-drawing stroke, such as is given in pruning shrubs and trimming grapevines.

The smooth edge upon the outer curve, from $b^1$ to $b^4$, is especially adapted for the purpose of skinning animals, &c.

We are well aware that an implement having serrated and smooth edges upon opposite sides of its blades is not new, but this we do not broadly claim; but,

Having thus fully described our invention,

What we claim as new, and desire to secure by Letters Patent, is—

The implement described, consisting of the handle A and blade B, of shape shown, provided with serrated and smooth edges as described, for the purpose set forth.

This specification signed and witnessed this 18th day of February, 1870.

NOYES E. BABCOCK.
GEORGE D. GOODSELL.

Witnesses:
G. W. FORD,
D. B. DEWEY.